No. 858,154. PATENTED JUNE 25, 1907.
J. CONVERSY.
FILTER.
APPLICATION FILED JULY 13, 1906.
2 SHEETS—SHEET 1.
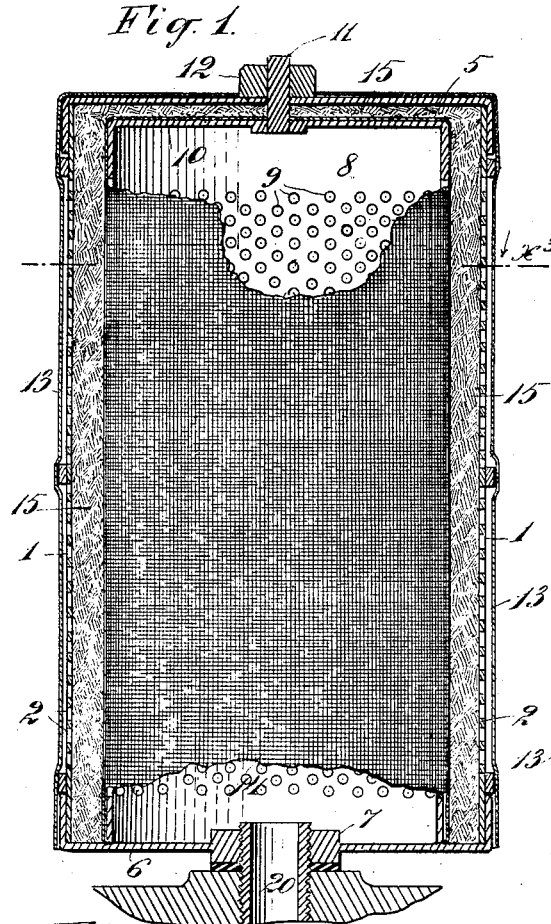
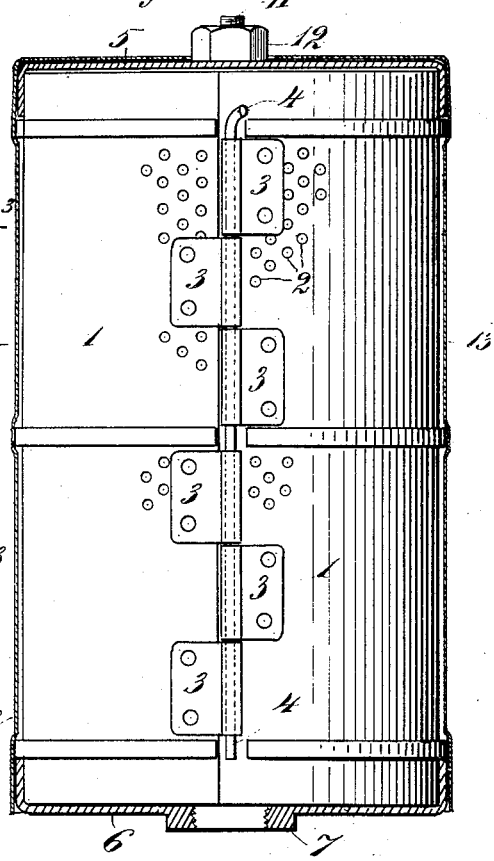
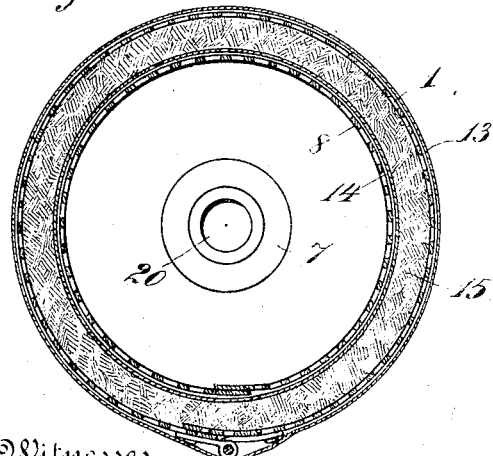
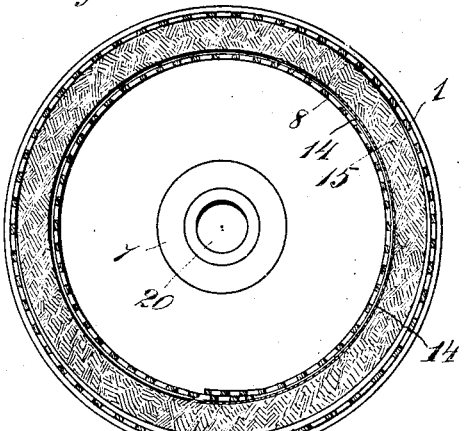
Witnesses
William J. Firth
Inventor
Joseph Conversy
By his Attorney No. 858,154. PATENTED JUNE 25, 1907.
J. CONVERSY.
FILTER.
APPLICATION FILED JULY 13, 1906.
2 SHEETS—SHEET 2.
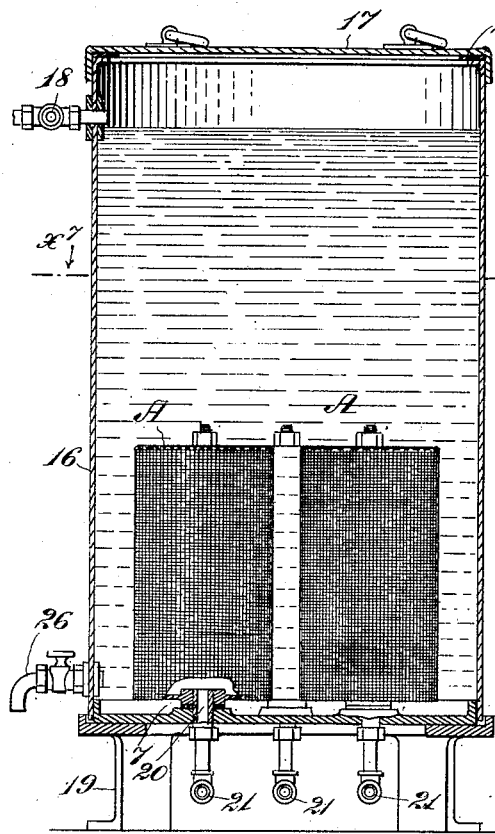
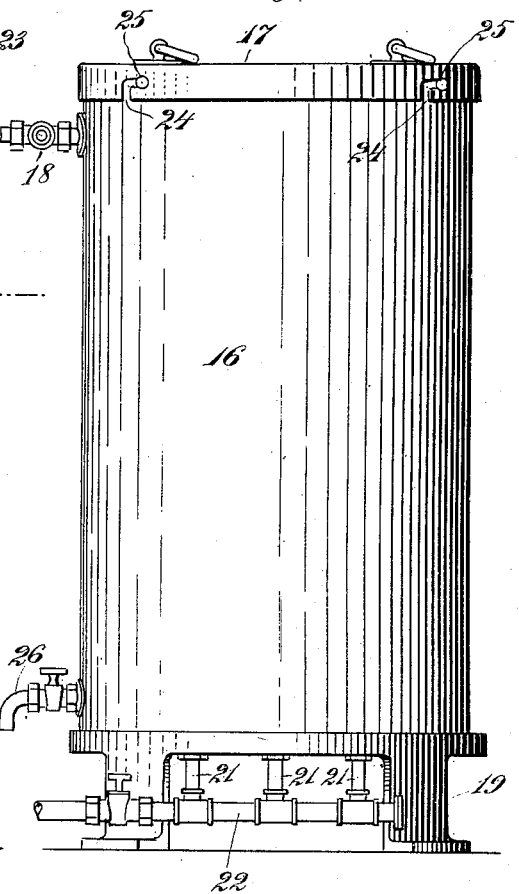
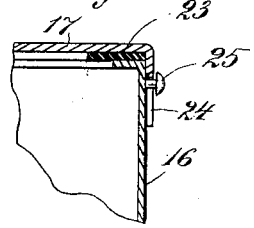
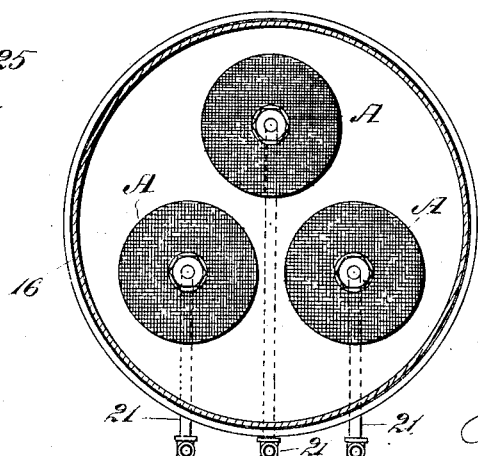
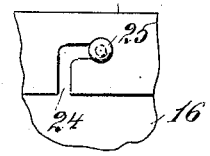

UNITED STATES PATENT OFFICE.

JOSEPH CONVERSY, OF NEW YORK, N. Y., ASSIGNOR OF ONE-HALF TO JOSEPH BOUQUET, OF NEW YORK, N. Y.

FILTER.

No. 858,154.      Specification of Letters Patent.      Patented June 25, 1907.

Application filed July 13, 1906. Serial No. 326,076.

*To all whom it may concern:*

Be it known that I, JOSEPH CONVERSY, a citizen of the United States, residing in the city, county, and State of New York, have invented certain new and useful Improvements in Filters, of which the following is a specification.

This invention relates to liquid filters which operate under pressure or a head, and especially to wine and beer filters; and the object of the invention is to provide a simple and efficient filtering device or apparatus composed of like elements, any number of which may be grouped to form a filter-battery or apparatus.

The filter - element possesses novel features which will be hereinafter described with reference to the accompanying drawings which serve to illustrate an embodiment of the invention.

In the said drawings—Figure 1 is an axial section of one of the filter-elements, except as to the inner drum which is only partly in section or broken away. Fig. 2 is a side elevation of the filter except as to the outer fabric and caps, which are in section. Fig. 3 is a transverse section of the filter element at line $x^3$ in Fig. 2. Fig. 4 is a similar section, but one showing the outer drum unlocked. Figs. 5, 6 and 7 are views on a smaller scale showing the apparatus or battery of filter-elements in a tank. Fig. 5 shows the tank in vertical section; Fig. 6 is a side elevation, and Fig. 7 is a horizontal section taken at line $x^7$ in Fig. 5. Figs. 8 and 9 are detail views of means employed for securing the cover on the tank.

The single filter or filter-element comprises the following features, namely, an outer drum 1, preferably cylindrical, of sheet metal perforated as seen at 2 in Fig. 2. This drum is open at both ends and open up one side, where the edges overlap, as seen in Figs. 3 and 4. Along these free edges of the drum are keeper-plates 3, alternately disposed on the respective edges, as clearly shown in Fig. 2; and through the eyes in the plates, in the manner of a loose hinge-pin, extends a locking rod 4, capable of being drawn out at will. This outer drum is herein shown as provided with three metal reinforcing bands secured to it exteriorly, one band being near the middle and the others near the ends thereof. These are merely to stiffen the metal of the drum. On the upper end of the drum 1 is fitted a cap 5, and on its lower end, a somewhat similar cap 6, provided with a nut, or internally screw-threaded boss 7, to receive a discharge pipe. Within and concentric with the outer drum, is an inner drum 8, made from sheet-metal and perforated as seen at 9 in Fig. 1. It may be said here that the upright walls of the two drums 1 and 8 will be uniformly perforated, or made from perforated sheet-metal, tinned sheet-copper being preferred. The drum 8 is open at its lower end, but closed by a cover-plate 10 at its upper end, where it is provided with an upright screw-stud 11 that passes through the cap 5 and is provided with a nut 12, which screws down on the cap and holds it in place.

Over the outer drum 1 is drawn a cover 13, of canvas, or similar woven fabric, and over the inner drum 8 is also drawn a similar cover 14, made also from similar material. These covers fit rather snugly over the respective drums. The two drums are of different diameters, and the annular space between them is packed with paper-pulp 15, or the like. This material may also extend over the upper end of the drum 8, and between it and the cap 5.

Referring now to Figs. 5, 6 and 7, which show the grouping of the filter-elements in a filtering apparatus: In these figures, 16 designates a tank provided with a removable cover 17, and an inlet 18 for the liquid to be filtered. This tank may be supported on a base 19, of any kind, and in it are set a plurality of filter-elements each designated in Figs. 5 and 7, as a whole, by A. Three elements are shown herein, although the number may be varied to suit the work to be done and the size of the tank. In the bottom of the tank 16, suitably disposed, are screw nipples 20, one of which is seen in Figs. 1 and 5, and on these are screwed, through the medium of the nuts 7, the several filter-elements A. The nipples 20 are the upturned ends of branch pipes 21, which connect with a single pipe 22, the several pipes being provided with suitable stop-cocks.

In the operation of the apparatus the beer or other liquid is admitted to the tank 16 at the inlet 18 and rises to a much higher level therein than the filter elements A. The pressure produced through the textile coverings of the outer and inner drums of the element and through the interposed paper-pulp, enters the inner drum, and flows off at the branch pipe 21 to the main discharge pipe 22. Obviously the pressure on the liquid in the drum may be produced in any manner desired, or known in the operation of force-feed filters.

The means employed for securing the cover on the tank 17 where pressure more than the head in the tank is applied to the liquid may be that seen in Figs. 8 and 9. The cover has in it a packing-ring 23, which rests on the margin of the tank, and a bayonet-fastening device, consisting of a slot 24 and stud 25, is employed to draw the cover down and form an hermetic joint. This is a known device and is not herein claimed.

The facilities for cleaning the filter element are important. The textile cover 13 is first drawn off and may be washed or cleansed; the element A is now unscrewed from the nipple 20 and lifted out of the tank; the nut 12 and caps 5 and 6 are removed; the locking rod 4 is now drawn out, when the outer drum will spring outward as seen in Fig. 4. This frees the inner drum 8 and allows it to be drawn out, its textile cover 14 removed and cleansed, and the paper-pulp removed. The parts being all separated they may be thoroughly cleansed and reassembled, fresh paper-pulp being supplied.

Obviously the drums 1 and 8 may be square or polygonal in form or of almost any shape; but the cylindrical form shown is least expensive, is strong, and is satisfactory in every way.

The tank may have a drainage cock 26, as shown in Figs. 5 and 6.

Having thus described my invention, I claim—

1. A filter-element, having an inner perforated drum closed at one end, an outer perforated drum having a joint at one side and provided with detachable means for holding said joint closed while the filter is in use, caps for closing the respective ends of said outer drum, one of said caps having in it a screw-threaded outlet for the filtered liquid, textile covers for the respective drums, and a packing of fibrous material in the annular space between the two drums.

2. A filter-element, having an outer, perforated drum of resilient sheet-metal provided with keeper-plates at its margins and a removable locking rod to engage said plates and hold the joint closed, removable caps on the respective ends of said drum, one of said caps having in it a screwthreaded outlet-aperture, an inner, perforated drum closed permanently at one end by a cover-plate and secured at this end to the outer cap of the outer drum, textile covers for the respective drums, and paper-pulp packed into the annular space between said drums.

3. A filter-element, having two perforated drums of sheet material, of different diameters, said drums being disposed one within the other, and fibrous material filling the annular space between the drums, the outer drum having a locked side joint adapted to be readily opened to permit the outer drum to expand by its own resiliency.

In witness whereof I have hereunto signed my name this 12th day of July, 1906, in the presence of two subscribing witnesses.

JOSEPH CONVERSY.

Witnesses:
HENRY CONNETT,
WILLIAM J. FIRTH.